United States Patent [19]
Lee et al.

[11] 3,788,036
[45] Jan. 29, 1974

[54] PRESSURE EQUALIZATION AND PURGING SYSTEM FOR HEATLESS ADSORPTION SYSTEMS

[76] Inventors: Hanju Lee, 5158 Evangeline Way, Columbia, Md. 21044; David E. Stahl, 8824-B Town & Country Blvd., Elliott City, Md. 21043

[22] Filed: July 26, 1972

[21] Appl. No.: 275,398

[52] U.S. Cl............................ 55/25, 55/62, 55/75, 55/389
[51] Int. Cl............................................. B01d 53/04
[58] Field of Search....... 55/25, 58, 62, 74, 75, 387, 55/179, 389

[56] References Cited
UNITED STATES PATENTS 3,142,547  7/1964  Marsh et al............................. 55/62
3,430,418  3/1969  Wagner.................................... 55/25
3,564,816  2/1971  Batta....................................... 55/62

Primary Examiner—Charles N. Hart
Attorney, Agent, or Firm—Michael L. McGreal et al.

[57] ABSTRACT

The present invention is concerned with an improved method for fractionating multicomponent gas mixtures. More specifically, the present invention is primarily concerned with the improved process wherein a multicomponent oxygen containing feed stream is fractionated into a stream relatively enriched in the oxygen component of the mixture. The present invention particularly concerns heatless fractionation systems for separating air into an oxygen enriched primary product stream and a nitrogen enriched secondary product stream.

16 Claims, 7 Drawing Figures

PRESSURE EQUALIZATION AND PURGING SYSTEM FOR HEATLESS ADSORPTION SYSTEMS

Heatless fractionation, or pressure swing separation, of gases or vapors takes advantage of the selectivity factor of a solid adsorbent. Solid adsorbents will usually adsorb and contain different gases or vapors to differing degrees. Different adsorbents will have different selectivities for various gases or vapors. By taking advantage of this selectivity, gases or vapors can be separated from a mixture. Complex organic mixtures which can be separated by heatless fractionation include ethane, propane, ethylene or propylene from each other or from higher n-paraffins or n-olefins, n-paraffins from isoparaffins, non-aromatics from aromatics, or mono-olefins from diolefins. An organic gas contaminated with inorganic or organic materials can also be purified using pressure swing adsorption systems. Illustrative of such a system is the removal of sulfur oxides, hydrogen sulfide, carbon dioxide, carbon disulfide and/or carbonyl sulfide from natural gas, ethane, propane, butane, ethylene, propylene, isoprene, or butadiene. Inorganic gases may also be purified by pressure swing techniques. This includes carbon dioxide and/or nitrogen removal from air so as to purify the air or provide an oxygen enriched air. Oxygen enriched air has many important medical and industrial uses. Pressure swing systems can also be used for drying inorganic or organic gaseous streams with water vapor being selectively adsorbed. These are just some of the useful applications of pressure swing systems generally, and particularly of the present system. As presently forseen, the pressure swing process and apparatus of this invention will have special utility in the fractionation of air to produce an enriched oxygen gas stream. The invention, will, therefore, be illustrated discussing the fractionation of air, since this is regarded as one of the best modes of using this pressure swing apparatus and practicing this pressure swing process.

Many varying heatless fractionation systems have been devised for separating a multicomponent gas such as air into its prime components. That is, air can readily be separated into an enriched oxygen containing stream and into a predominantly nitrogen containing stream. Generally, the predominantly oxygen containing stream is the most commerically useful and sought product item. A basic heatless fractionation system is set out in U.S. Pat. No. 2,944,627. The unique feature of this patent is the use of some enriched product gas as the purge gas for the adsorption bed which is being regenerated. Although an improvement in past processes, this patented process has the disadvantage that significant quantities of product gas are lost as the regenerating means. U.S. Pat. Nos. 3,142,547 and 3,237,377 are directed to improvements on the above mentioned patent. These improvements consist in varying ways of conserving the product gas while yet effectively regenerating the adsorbent bed. In U.S. Pat. No. 3,142,547, the adsorbent bed, which is at high pressure, is pressure equalized with a pressure equilization phase. The purpose of pressure equalizing is essentially to conserve some of the pressurized gas in the adsorbent bed prior to regeneration. This conserved pressurized gas is then used as the purging gas for the adsorbent bed when it is on regeneration at low pressure. In U.S. Pat. No. 3,237,377, the adsorbent bed which is completing an adsorption phase is pressure equalized with an adsorbent bed which is completing a regeneration phase as a means of increasing the efficiency of the overall system. The aim here is also to conserve both pressure and enriched gas. In this way, the amount of product gas which is used for purging is decreased to a minimum, if it is necessary at all.

The present process is an improved version over these and other prior art techniques. The present process may very easily be applied to adsorption systems using from 1 to 4 beds. The essential feature of the present invention is a sequential pressure equalization technique. By sequential pressure equalization is meant that the high pressure gas in the bed which is completing an adsorption phase is used both for repressurization of the bed which is to initiate an adsorption phase and also to supply the gas for its own purge. In a single bed system, there are required two pressure equalization tanks. On completion of the adsorption phase in a single bed system, this bed which is now at a high pressure is pressure equalized with a first tank, this first tank then being at a first high pressure. The adsorbent bed is then sequentially pressure equalized with a second tank, this second tank then being at a lower pressure in relation to the first tank. After this second pressure equalization, the adsorbent bed is allowed to pressure equalize with the exterior atmosphere, or may be reduced to subatmospheric pressures. The reduction to subatmospheric pressures requires the use of vacuum equipment. The gas in the low pressure tank is then used as a purge gas for this adsorbent bed. After regeneration is complete, the gas which has been stored in the first high pressure tank is used to repressure the adsorbent bed prior to going on to an adsorption phase. In a single bed system, the flow of product gas will be intermittent due to this necessity of regeneration. However, a continuous flow can be maintained if a surge tank is used to store part of the enriched oxygen gas produced during the adsorption phase and allowing this to flow to the site of use during the regeneration phase. A two adsorbent bed system requires only a single tank for pressure equalization. This single tank will be equivalent to the low pressure tank used in the single bed system. In the two adsorbent bed system, the adsorbent bed which has just completed an adsorption phase and is at a high pressure, is first pressure equalized with the second adsorbent bed, which has just completed a regeneration and is to now commence an adsorption phase. This raises the second adsorbent bed to a higher pressure and conserves the oxygen enriched medium that is in the void space of the first adsorbent bed. After pressure equalization with the second adsorbent bed, the first adsorbent bed is then pressure equalized with a pressure tank. After the second pressure equalization, the first adsorbent bed is pressure equalized with the exterior atmosphere, or is reduced to a subatmospheric pressure by means of vacuum equipment. Gas from the pressure tank is then allowed to flow through the first adsorbent bed, purging this bed of adsorbed gases. During this time, the second adsorbent bed is now on an adsorption phase. In three and four adsorbent bed systems, there is the option to replace the tank in the two adsorbent bed system with a third adsorbent bed. That is, in three and four adsorbent bed systems, one of the adsorbent beds would be used as a storing means for the low pressure gas which is to be used during a subsequent purging.

It is, therefore, a prime object of the present invention to set out highly efficient heatless fractionation systems using from one to four adsorbent beds. This high efficiency is achieved by maximizing the use of the high pressure gas remaining in the adsorbent bed or beds which are completing an adsorption phase.

The prime object and other objects of this invention are accomplished by the embodiments which are now going to be set out in more detail. These will specifically be set out in regard to the separating of an air stream into its principal components, oxygen and nitrogen; however, it is reiterated that essentially any gaseous mixture can be separated using the principles of this invention. What is essential to this invention is a sequential pressure equalization technique. That is, the high pressure in the adsorbent bed which is to commence a regeneration phase is conserved by a dual pressure equalization. This high pressure is used firstly to repressurize a bed which is to commence an adsorption phase and, two, is used as the purge medium for the adsorbent bed from which it has flowed. By this technique, the bed which is completing an adsorption phase produces its own purge gas, thereby conserving the amount of product gas, if any, which must be used.

A two adsorbent bed system and a one adsorbent bed system will now be discussed in more detail. In order to provide an explicit example, these preferred embodiments will be set out with air being the gaseous mixture which is to be separated into its prime components. An enriched oxygen component in this discussion will be the primary product, while the enriched nitrogen component will be considered as the principal removed contaminant, and is designated as the secondary product. The system could, however, easily be modified to also collect the enriched nitrogen stream.

Figure 1:
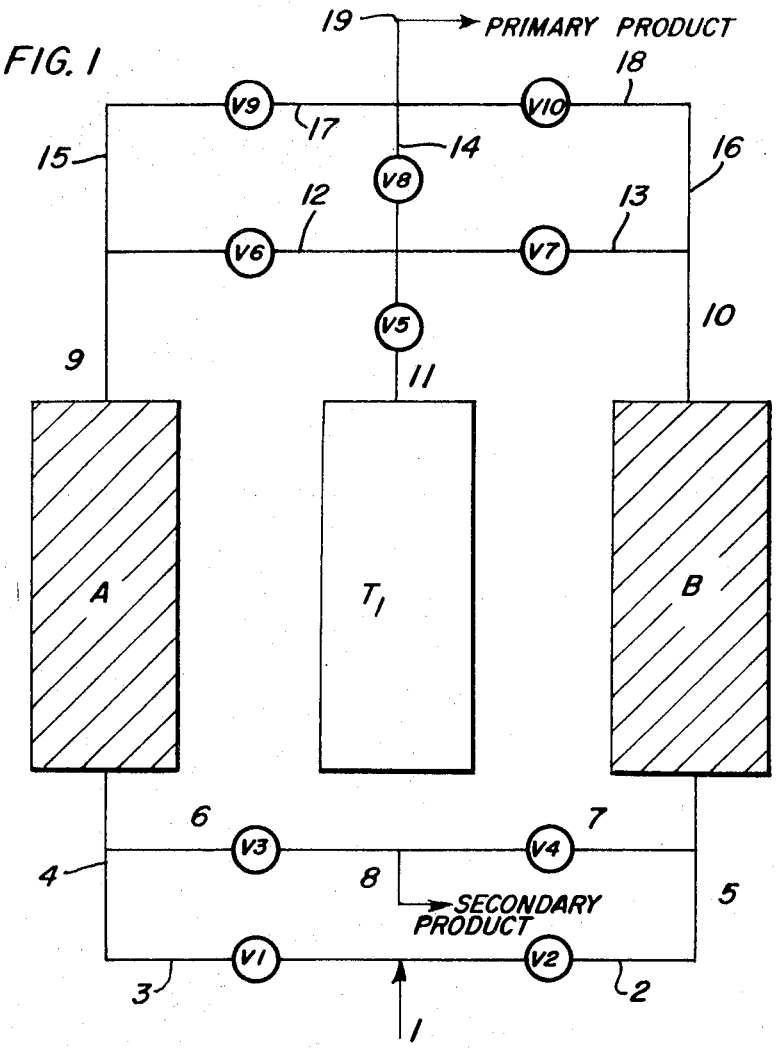
FIG. 1 is a schematic of a two adsorbent bed system utilizing sequential pressure equalization.

In FIG. 1, A and B represent the adsorbent beds and T1 a tank which is used solely for pressure equalization. The adsorbent in A and B is preferably an aluminosilicate crystalline zeolite. These zeolites exhibit a strong adsorption preference for nitrogen, thereby providing the means for separating a gaseous stream containing nitrogen and another component, such as oxygen. Other useful adsorbents are silica gels, alumina, alumina gels and activated carbons. The very useful synthetic crystalline zeolites are those designated Z 12, Z 14 and Z 14 US by the Davison Division of W. R. Grace, and those designated Zeolite A, Zeolite X, Zeolite Y and Zeolite L by the Linde Division of Union Carbide. Also useful are the naturally occurring zeolites such as erionite, mordenite, chabazite, heulandite, gmelinite, ferriorite and others. These zeolites may be used in the alkali form or in a partially or substantially completely ion exchanged form. Essentially any cation may be exchanged into the zeolite structure for the originally present cation. What is important in the selection of an adsorbent is that it has a high selectivity for at least one component of the mixture. That is, the solid adsorbent must attractively hold at least one component gas at a higher adsorption energy than other components of the gas. However, this preferable attraction of at least one component gas must not be of a degree where removal on adsorbent bed regeneration would be difficult. In essence, the ideal adsorbent for a pressure swing system is one which has a high degree of selectivity on adsorption for at least one component, but which easily releases this adsorbed one component on adsorbent bed regeneration. The zeolites are the presently best known adsorbents, with the particular zeolite chosen in regard to its pore size and selectivity for the gaseous separation.

Figure 2:
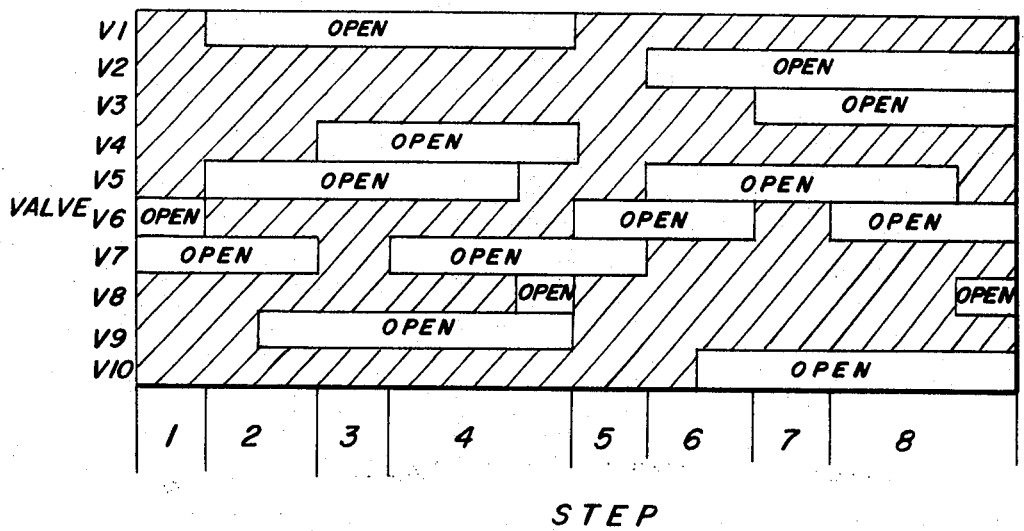
FIG. 2 is a chart sequence of valve operation for a two adsorbent bed system.
Figure 3:
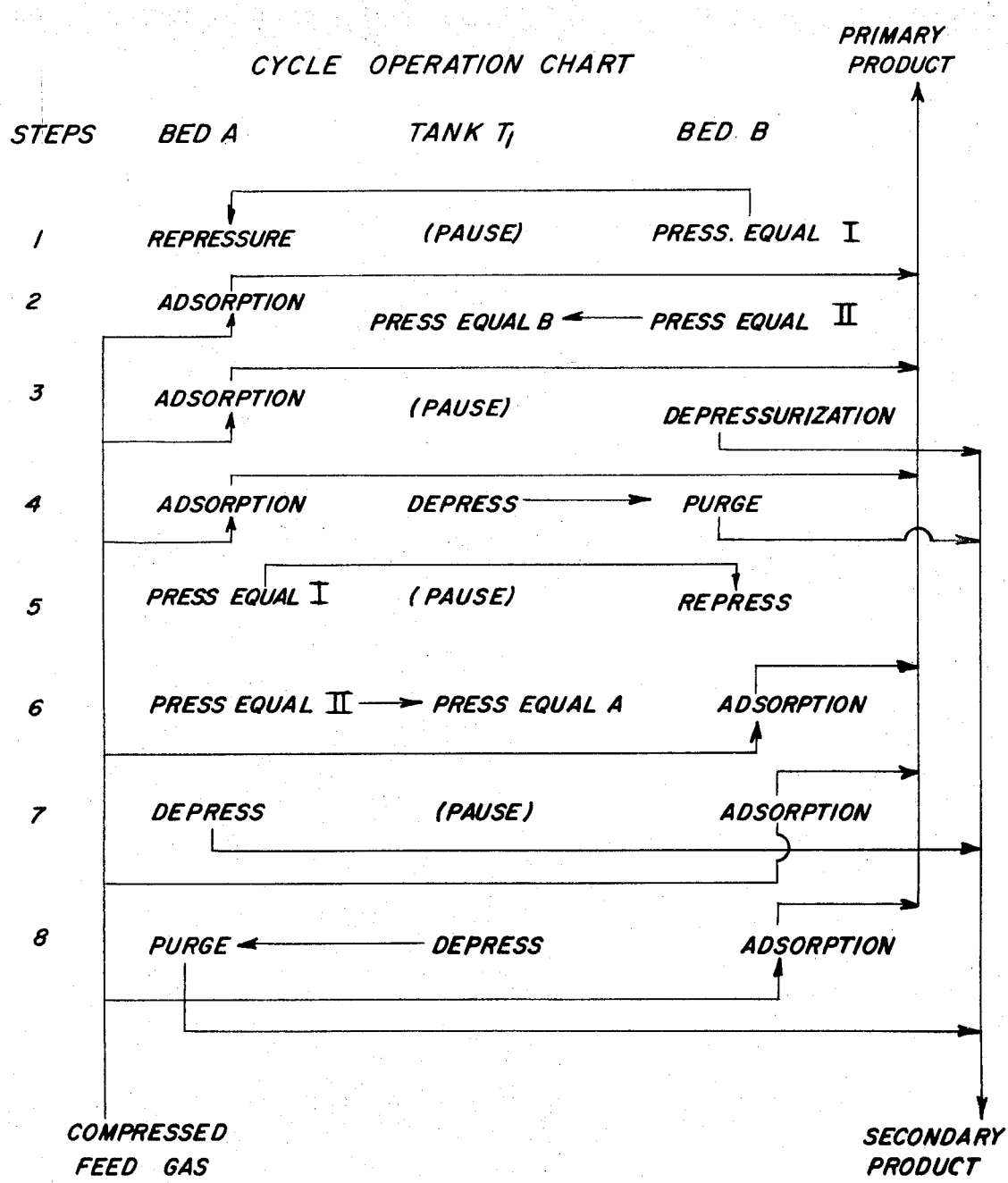
FIG. 3 is a chart of the stepwise operation of the adsorbent beds.

FIG. 2 illustrates a preferred valve operation sequence for the device of FIG. 1, and FIG. 3 sets out the sequential stepwise operation of the device of FIG. 1. The following description for the operation of the two adsorbent bed systems will be with reference to these three figures.

Since this is a continuous process with the adsorbent beds in a cyclic operation, the point in the process for initiating description will arbitrarily be chosen at the step of pressure equalizing adsorbent bed A with adsorbent bed B, that is, the depressurizing of adsorbent bed B and the repressurizing of adsorbent bed A. In this description, all valves will be considered to be closed during any step except those that are specifically stated to be open. This repressurization prepares adsorbent bed A for an adsorption cycle, and pressure equalizes adsorbent bed B to a first lower pressure. The high pressure gas which flows from adsorbent bed B to adsorbent bed A consists mostly of the void space gas which has an oxygen content greater than that of air, the feed gas. The adsorbent bed A is repressurized to approximately half the adsorption phase operating pressure. The adsorption phase operating pressure preferably ranges from about 10 psig to 150 psig with pressures of up to 1,000 psig and higher very operable. Therefore, after this first step, each of the adsorbent beds will be at a pressure of about 5 psig to 75 psig.

During this repressurization of adsorbent bed A (step 1 in FIG. 2), valves V6 and V7 are open with the other valves being closed. The repressurization gas, therefore, flows from adsorbent bed B through conduits 10, 13, 12 and 9 to adsorbent bed A. The time of repressurization ranges from 1 to 30 seconds, with longer periods being operable. After this repressurization of adsorbent bed A by pressure equalization with adsorbent bed B, adsorbent bed A starts an adsorbing phase. This adsorbing phase ranges for a time duration of usually about 10 to 180 seconds. The actual time duration will be determined by the volume of adsorbent and the rate of flow of air into the adsorbent bed. During this adsorption phase for adsorbent bed A, valves V1 and V9 are opened, with compressed air entering at 1 and flowing via conduits 3 and 4 into adsorbent bed A. Opening V9 can be delayed to allow adsorbent bed A to repressurize before removing product. Nitrogen from the air stream gets adsorbed in the bed with an oxygen enriched primary product stream exiting from the bed and flowing by conduits 9, 15, 17 and 19 for subsequent use.

During this phase of adsorption for adsorbent bed A, adsorbent bed B is being regenerated. In actuality, the repressurization of adsorbent bed A by a pressure equalization with adsorbent bed B is a first step of the regeneration of adsorbent bed B. The second step of regeneration for adsorbent bed B consists of a pressure equalization with tank T1. Valves V7 and V5 are open during this step. Depending on the volume of tank T1, an equilibrium pressure between about ambient and the first equalization pressure will result. This gas which flows into tank T1 has an oxygen concentration greater than air, and is at a pressure of about 5 psig to 75 psig prior to flow into tank T1. The time duration of this second pressure equalization is about 0.1 to 30 seconds. The third step of regenerating adsorbent bed B consists of depressurizing the bed to ambient pressure or subatmospheric pressure by closing valve V7 and opening valve V4. With valve V4 opened, gas exits adsorbent bed B and flows by conduits 7 and 8 to the atmosphere. Optionally, a negative absolute pressure (vacuum) of about 75 mmHg to ambient pressure may be drawn on conduit 8. This will further aid in regeneration. The time duration of depressurization is about 0.1 to 60 seconds.

After this second repressurization step, adsorbent bed B undergoes a purge step. During this purge step, the gas stored in tank T1 slowly flows through adsorbent bed B. This is effected by reopening valve V7 and allowing valve V4 to remain open from the previous repressurization step. Purge gas, therefore, flows via conduits 11, 13 and 10 to adsorbent bed B and exits this bed by conduits 5, 7 and 8 and vents to the atmosphere or to a vacuum system, if a vacuum is being used. This removed gas stream is the secondary product stream. The time duration of purge may be from about 8 to 90 seconds.

Optionally in this process, there may also be a product purge. By product purge is meant that some of the enriched oxygen product gas from the adsorbent bed A which is still on an adsorption step may be flowed through adsorbent bed B in order to increase the degree of nitrogen removal, and thus regeneration. This is easily effected by closing valve V5 and opening valves V6, V8 or V10 and allowing some product gas to flow to adsorbent bed B. Preferably, valve V8 is opened, with valve V5 closed. As a general rule, the volume of enriched oxygen product gas used as a purge should be kept to a minimum, since as the volume of output oxygen enriched gas decreases, the efficiency of the overall process likewise decreases. Therefore, the use of oxygen enriched product gas as a purge gas should be balanced so as to optimize the overall process.

After the purge step, adsorbent bed B is at a stage to be pressure equalized with adsorbent bed A, thereby repressurizing adsorbent bed B. During this multistep regeneration of adsorbent bed B, adsorbent bed A has been on an adsorption step. Adsorbent bed A now is at a point of almost full saturation with adsorbed nitrogen. Prior to breakthrough, that is, prior to the point when the nitrogen content increases in the oxygen enriched product gas which exits the adsorbent bed, valves V1 and V9 are closed and valves V6 and V7 are opened so as to pressure equalize with adsorbent bed B, which is to start an adsorption step. The time duration of this pressure equalization is about 1 to 30 seconds. After this pressure equalization-repressurization, valve V7 is closed and valves V2 and V10 are opened. The opening V10 can be delayed to allow adsorbent bed B to repressurize before removing product. Air then flows via conduits 1, 2 and 5 into adsorbent bed B with an oxygen enriched product gas exiting and flowing via conduits 10, 16, 18 and 19 to subsequent use.

During this adsorption phase of adsorbent bed B, adsorbent bed A undergoes the same steps of regeneration as have been outlined for adsorbent bed B. That is, after the first pressure equalization step, which is also the first regeneration step, valve V7 is closed and valve V5 opened. Adsorbent bed A is then pressure equalized with tank T1. The time duration of this pressure equalization is about 0.1 to 30 seconds. Valve V6 is then closed, and valve V3 opened so as to depressurize adsorbent bed A by exhausting any remaining pressure to the atmosphere via conduit 8. A vacuum system optionally be used as disclosed for the regeneration of adsorbent bed B. Depressurization is complete in about 0.1 to 60 seconds, with the gas in the bed exhausting via conduits 4, 6 and 8 to the atmosphere. Valve V6 is then opened, and valve V3 continued open, and the gas previously stored in tank T1 is allowed to flow through this bed as a purge gas. The time duration of purge gas flow is from about 8 to 90 seconds. This purge gas exits to the atmosphere or to a vacuum system via conduits 4, 6 and 8.

As with adsorbent bed B, the purge gas used in adsorbent bed A may include some oxygen enriched product gas. This may flow from adsorbent bed B to adsorbent bed A by any of three routes. Valve V7 may be opened with valve V5 closed, resulting in product gas flowing via conduits 13, 12 and 9 to adsorbent bed A, or valve V8 may be opened with valve V5 closed and oxygen enriched product gas flowing via conduits 14, 12 and 9 to adsorbent bed A, or valve V9 may be opened and valve V6 closed with oxygen enriched product gas flowing via conduits 17, 15 and 9 to adsorbent bed A. Preferably, valve V8 is opened and valve V5 closed. In any instance, however, the amount of this enriched oxygen product gas which is used as a purge gas should be held to a minimum. After purging, adsorbent bed A is ready to be repressurized and go on another adsorption step, thus starting another cycle.

Those skilled in the art will perceive various minor changes which can be made in this apparatus and process. These are, however, considered to be within the present concept. One obvious expedient is to at least partially repressurize the bed which is to start an adsorption step with oxygen enriched product gas. This can be accomplished by closing valve V3 or V4 and flowing product gas to the bed which is to be repressurized. By using at least some product gas for repressurization, more gas in the pressure equalizing steps may be reserved for flow into tank T1. Obviously, the adsorbent bed which is to start an adsorption step may be repressurized solely with product gas, thereby reserving all repressurization gas for purging. In this embodiment, then, essentially no product gas need be used as a purge gas. It is also possible to at least partially fill the tank T1 with an adsorbent, zeolitic or otherwise. If filled with a zeolite adsorbent, the purge gas will have a yet higher oxygen content. In yet another embodiment, in place of depressurization to atmospheric pressure, vacuum equipment can be used to reduce the pressure to subatmospheric pressures such as 75 mmHg up to ambient pressure. This is a technique which is useful in reducing regeneration time.

Figure 4:
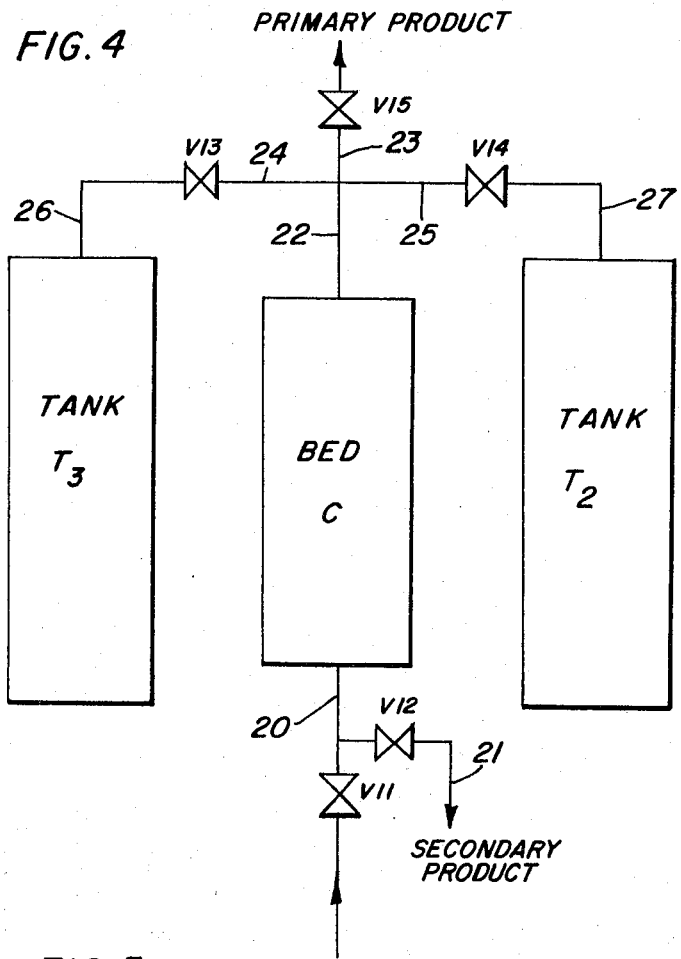
FIG. 4 is a schematic of a single adsorbent bed system utilizing two pressure equalization tanks.
Figure 5:
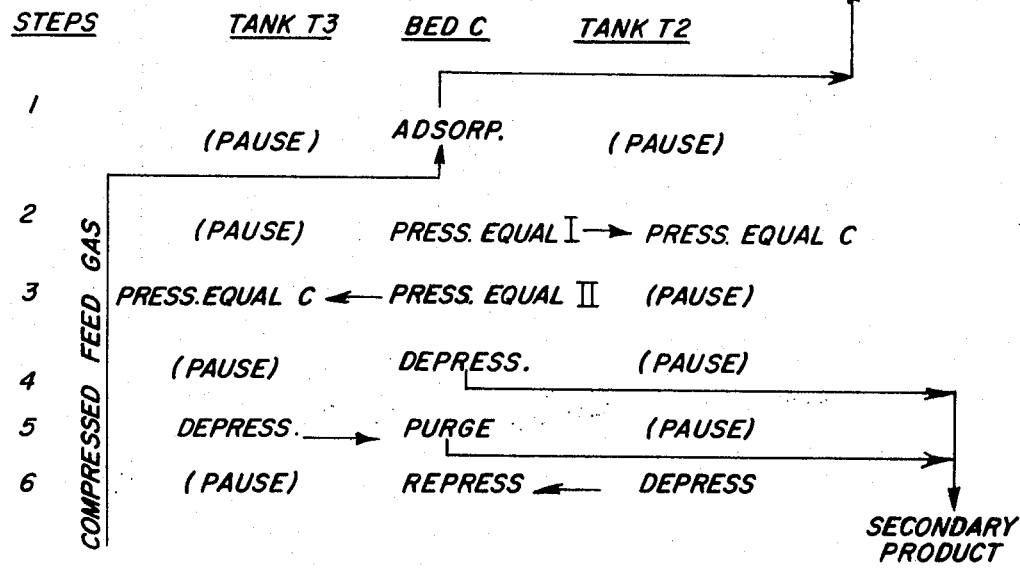
FIG. 5 is a chart of the stepwise operation of the adsorbent bed of FIG. 4.

FIG. 4 illustrates a single adsorbent bed system using the concept of the present invention, with FIG. 5 setting out the steps of the preferred operation of this single bed system. This single bed system will produce an oxygen enriched gas intermittently, so if a continuous flow is desired there will have to be used a surge tank from which oxygen enriched gas can be withdrawn during adsorbent bed regeneration. Such a surge tank is not shown in the drawing, since it is not a necessary part of the process apparatus. The starting point for explanation of this process will arbitrarily be at the initiation of the adsorption step. When adsorbent bed C is on adsorption step, valves V11 and V15 are open with compressed air flowing via conduit 20 to adsorbent bed C. In adsorbent bed C, nitrogen is selectively removed with an oxygen enriched gas exiting via conduits 22 and 23 for use. The inlet air to the bed is at a pressure of about 25 psig to 150 psig or higher. The actual time duration of passing air to the bed will depend on the bed volume and the rate of flow of air.

This time duration will usually range from about 10 to 180 seconds. At the time when the adsorbent bed is loaded with nitrogen, and just prior to breakthrough, the valves V11 and V15 are closed and valve V14 opened. Adsorbent bed C then pressure equalizes with tank T2 to a first lower pressure. The initial pressure of adsorbent bed A and the volume of tank T2 will determine the resulting pressure in T2 and bed C. After this pressure equalization, which occurs in about 0.1 to 30 seconds, valve V14 is closed and valve V13 opened. Adsorbent bed C now pressure equalizes with tank T3 via conduits 22, 24 and 26 to a second, lower pressure. Valve V13 is then closed, and valve V12 opened. Adsorbent bed C in this step pressure equalizes with the atmosphere via conduits 20 and 21, with desorption of some of the adsorbed nitrogen. This step is accomplished in a time duration of from 0.1 to 30 seconds.

The following step consists of opening valve V13 and allowing stored gas from T3 to slowly pass through adsorbent bed C tO purge this bed. Valve V12 remains open during this purge. Optionally, some product gas may be diverted from the surge tank and used for purging if desired. The time duration of the purge step is about 10 to 60 seconds.

After purging of adsorbent bed C is complete, valves V12 and V13 are closed, and valve V14 opened. High pressure gas flows from tank T2 to bed C, thereby repressurizing this adsorbent bed. Valve 14 is then closed, and valves V11 and V15 are opened, and adsorbent bed C begins another adsorption phase.

Likewise in this process and apparatus, various modifications may be made but yet be within the present concept. The volumes of the tanks may be varied. Also, a product surge tank may be used and vacuum equipment may be used on depressurization to decrease the bed pressure to less than ambient pressures. These and other modifications, however, are considered to be inherent in the present process and apparatus.

Figure 6:
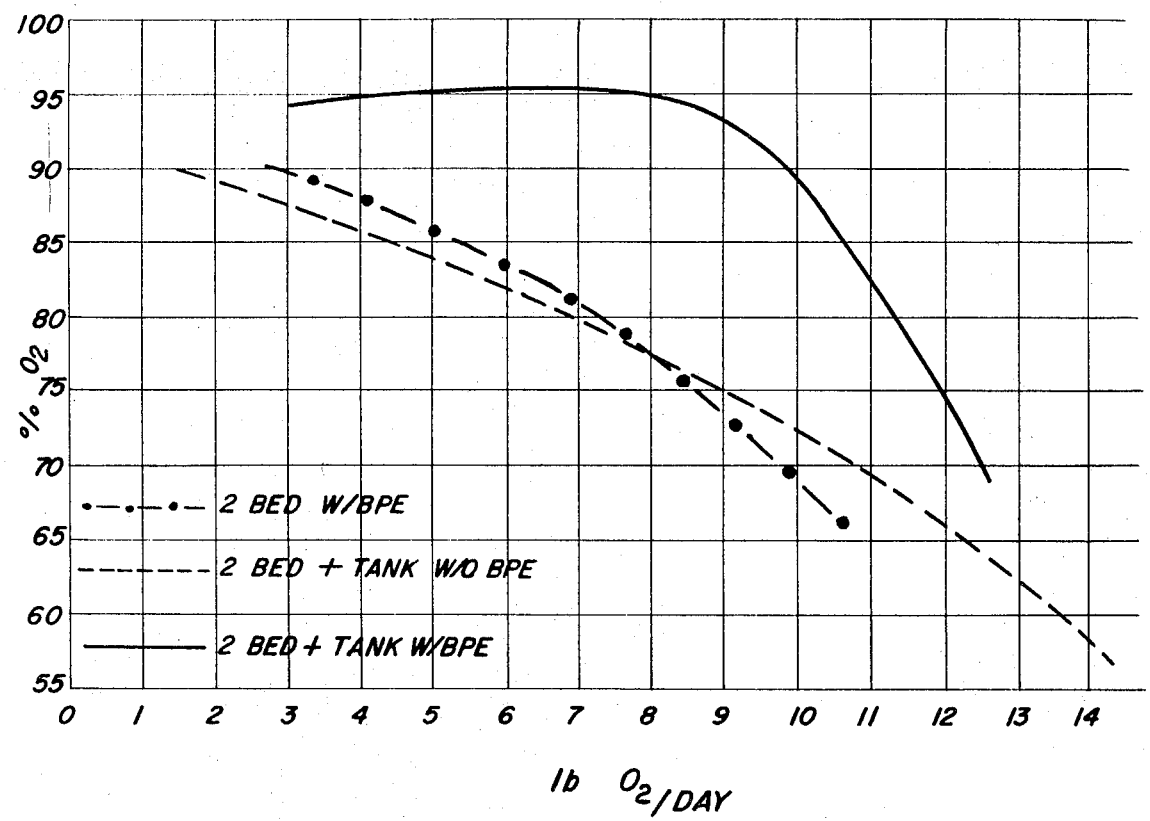
FIG. 6 is a graph illustrating the improved product output and product purity of the two adsorbent bed system of this invention in comparison to other systems.
Figure 7:
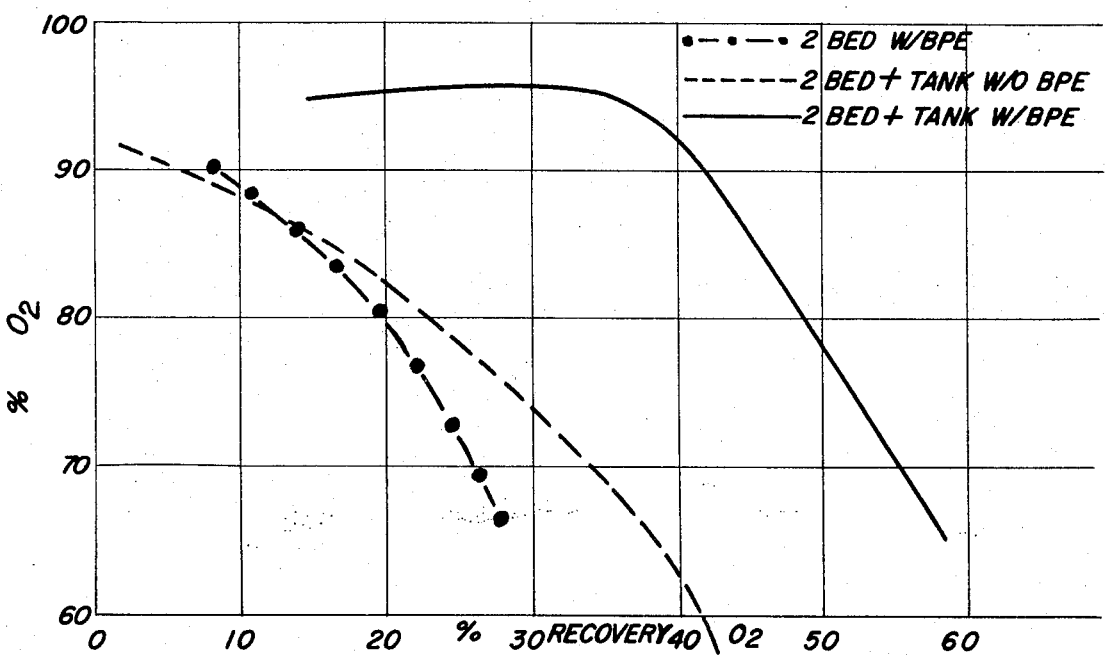
FIG. 7 is a graph illustrating the improved product recovery rate and product purity of the two adsorbent bed system of this invention in comparison to other systems.

FIGS. 6 and 7 illustrate the increased efficiency of the two bed and one tank system which incorporates dual sequential bed pressure equalization steps (2 bed + tank w/BPE). This is compared to a two bed system with no tank whch includes only bed pressure equalization step prior to initiation of an adsorption phase (2 bed w/BPE) and a two bed, one tank system which uses solely a single pressure equalization step with the tank and the use of this stored gas as an adsorbent bed purge gas (2 bed + tank w/o BPE). The adsorbent bed of FIG. 1 is used for this comparison with each bed containing 10.3 lbs. of zeolite 5A molecular sieve. Input air pressure is 50 psig, and the cycle time of adsorption and regeneration is 120 seconds. Table 1 compares the time durations for each of the steps of each process. This apparatus can be used for each process merely by the opening and closing of valves. That is, in the process of two beds, valve V5 is always maintained closed, with valves V6 and V7 being opened at the appropriate time to that some product gas can be used as the purge media. This serves to repressurize one of the adsorbent beds. For the embodiment of two adsorbent beds and one tank with dual sequential bed pressure equalizations, the apparatus as previously described is used. For the embodiment of two adsorbent beds and one tank without bed pressure equalization, valves V6 and V5, or valves V7 and V5, are opened at the appropriate time, depending on the adsorbent bed completing the adsorption phase.

The plots in FIGS. 6 and 7 illustrate the benefit of the process using two adsorbent beds and one tank along with a dual sequential bed pressure equalization. This benefit is a higher percent oxygen in the produce, a higher production capacity and a greater recovery of oxygen. The recovery is more than 55 percent, at product purity of 70 percent oxygen. The improvement in recovery of oxygen is even more pronounced at a higher oxygen content as shown in FIG. 6. This is a significant improvement and is a significant factor in making this process commercially feasible.

Other benefits of the process and apparatus of this invention will be obvious to those in the art. However, systems using a dual adsorbent bed pressure equalization as above set out would be within the scope of this invention.

TABLE 1

| Step | 2 Bed | 2 Bed and Tank w/BPE | 2 Bed and Tank w/o BPE |
|---|---|---|---|
| Adsorption | 46 sec. | 46 sec. | 55 sec. |
| Pressure equilization with adsorbent bed | 9 sec. | 9 sec. | — |
| Pressure equalization w/tank | — | 10 sec. | 10 sec. |
| Repressurization | 13 sec. | 10 sec. | 12 sec. |
| Tank Self Purge | — | 31 sec. | 38 sec. |
| Product purge | 38 sec. | — | — |
| Repressure | 5 sec. | 5 sec. | 5 sec. |

What is claimed is:

1. A cyclic method for fractionating a gaseous mixture wherein at least one component is selectively adsorbed on a solid adsorbent to a greater extent than other components comprising flowing said gaseous mixture into an adsorbent bed for selective adsorption of at least one component so as to produce a product stream flowing from said adsorbent bed enriched in other components; continuing said flow of gaseous mixture until said adsorbent bed has adsorbed a substantial amount of said one component; discontinuing the flow of said gaseous mixture, interconnecting said adsorbent bed with a first tank whereby said adsorbent bed and said first tank are pressure equalized to a first lower pressure, interconnecting said adsorbent bed with a second tank next whereby said adsorbent bed and said second tank are pressure equalized to a second lower pressure; depressurizing said adsorbent bed to at least about atmospheric pressure; flowing the second lower pressure gas from said second tank through said adsorbent bed as a pruge gas; and flowing the first lower pressure gas into said adsorbent bed whereby said adsorbent bed is at least partially repressurized prior to commencing adsorption and a further cycle of operation.

2. A method as in claim 1 wherein during the flow of purge gas through said adsorbent bed a portion of the product stream gas is flowed through said adsorbent bed as a part of said purge gas.

3. A method as in claim 1 wherein said solid adsorbent is a crystalline zeolite.

4. A method as in claim 1 wherein said gaseous mixture is air, said one component comprises substantially nitrogen, and said other component is enriched in oxygen.

5. A cyclic method for fractionating a gaseous mixture wherein at least one component is selectively adsorbed on a solid adsorbent to a greater extent than other components, comprising flowing said gaseous mixture into a first adsorbent bed for selective adsorption of at least one component so as to produce a product stream flowing from said first adsorbent bed enriched in other components and continuing said flow until said first adsorbent bed has adsorbed a substantial amount of said one component; simultaneously interconnecting a second adsorbent bed with a tank so as to pressure equalize said second adsorbent bed to a second lower pressure; depressurizing said second adsorbent bed to at least about atmospheric pressure; flowing the second lower pressure gas from said tank through said second adsorbent bed as a purge gas; interconnecting said first adsorbent bed and said second adsorbent bed, whereby said first adsorbent bed is pressure equalized to a first lower pressure and said second bed is pressure equalized to a higher pressure; flowing said gaseous mixture into said second adsorbent bed for selective adsorption of at least one component so as to produce a product stream flowing from said second adsorbent bed enriched in other components and continuing said flow until said second adsorbent bed has adsorbed a substantial amount of said one component; simultaneously interconnecting said first adsorbent bed with said tank so as to pressure equalize said first adsorbent bed to a second lower pressure; depressurizing said first adsorbent bed as a purge gas; and interconnecting said first adsorbent bed and said second adsorbent bed, whereby said second adsorbent bed is pressure equalized to a first lower pressure and said first adsorbent bed is pressure equalized to a higher pressure, thereby preparing said first adsorbent bed for selective adsorption of said one component of said gaseous mixture in the next cycle.

6. A method as in claim 5 wherein during the period of flow of gas from said tank to said first adsorbent bed or to said second adsorbent bed, a portion of the product stream enriched in an other component is flowed through said first adsorbent bed or said second adsorbent bed as an additional purge gas.

7. A method as in claim 5 wherein following the period of flow of gas from said tank to said first adsorbent bed, or to said second adsorbent bed, a portion of the product stream enriched in an other component is flowed through said first adsorbent bed or said second adsorbent bed as an additional purge gas.

8. A method as in claim 5 wherein during and following the period of flow of gas from said tank to said first adsorbent bed or to said second adsorbent bed a portion of the product stream enriched in an other component is flowed through said first adsorbent bed or said second adsorbent bed as an additional purge gas.

9. A method as in claim 8 wherein said solid adsorbent is a crystalline zeolite.

10. A method as in claim 9 wherein said gaseous mixture is air, and one component comprises substantially nitrogen and said other component is enriched in oxygen.

11. A method as in claim 5 wherein said solid adsorbent is a crystalline zeolite.

12. A method as in claim 11 wherein said gaseous mixture is air, and one component comprises substantially nitrogen and said other component is enriched in oxygen.

13. A method as in claim 5 wherein the desorption and purging pressure is subatmospheric.

14. An apparatus for fractionating gaseous mixtures comprising:
   three pressure vessels with one pressure vessel containing a solid adsorbent selective for at least one component of a gaseous mixture;
   an input conduit for flowing said gaseous mixture to one end of said solid adsorbent containing pressure vessel;
   valve means on said input conduit for selectively directing gaseous mixture to said solid adsorbent containing pressure vessel and for interconnecting said solid adsorbent containing pressure vessel with the atmosphere;
   an output conduit with valve means for selectively flowing gaseous material to the other pressure vessels and for flowing a fractionated gas from said solid adsorbent containing pressure vessel.

15. An apparatus as in claim 14 wherein said solid adsorbent containing pressure vessels contain a crystalline zeolite adsorbent.

16. An apparatus as in claim 15 wherein said crystalline zeolite adsorbent is of a type which selectively adsorbed nitrogen from an oxygen and nitrogen containing gas.

* * * * *